(12) United States Patent
Takhmar et al.

(10) Patent No.: US 11,608,089 B2
(45) Date of Patent: Mar. 21, 2023

(54) METHOD AND APPARATUS FOR AUTOMATED LATERAL CONTROLS ADAPTATION IN RESPONSE TO RAPID TRAJECTORY CHANGES

(71) Applicant: GM GLOBAL TECHNOLOGY OPERATIONS LLC, Detroit, MI (US)

(72) Inventors: Amir Takhmar, Toronto (CA); Jayant Sachdev, Toronto (CA); Mohammed Raju Hossain, Oshawa (CA); Nathan Fujimoto, Mississauga (CA); Joshua M. Levin, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 256 days.

(21) Appl. No.: 17/092,790

(22) Filed: Nov. 9, 2020

(65) Prior Publication Data

US 2022/0144308 A1 May 12, 2022

(51) Int. Cl.
*B60W 60/00* (2020.01)
*B62D 6/08* (2006.01)
*G05D 1/02* (2020.01)

(52) U.S. Cl.
CPC .............. *B60W 60/007* (2020.02); *B62D 6/08* (2013.01); *G05D 1/0214* (2013.01); *B60W 2710/202* (2013.01)

(58) Field of Classification Search
CPC ........... G05D 1/0214; B60W 2710/202; B62D 15/0265
See application file for complete search history.

(56) References Cited

U.S. PATENT DOCUMENTS

| | | | | |
|---|---|---|---|---|
| 5,762,160 | A * | 6/1998 | Shimizu | B62D 15/0265 180/443 |
| 11,187,793 | B1 * | 11/2021 | Liu | G05D 1/0088 |
| 2012/0123643 | A1 * | 5/2012 | Limpibuntering | B62D 15/025 701/42 |
| 2014/0222295 | A1 * | 8/2014 | Dornhege | B62D 6/002 701/42 |
| 2015/0094915 | A1 * | 4/2015 | Oyama | B60W 30/12 701/42 |
| 2016/0288831 | A1 * | 10/2016 | Lee | B60W 30/12 |

(Continued)

OTHER PUBLICATIONS

Z. Gajic and M. Lelic, Prentice Hall, Europe, 1996, ISBN 0-13-134116-2 (Year: 1996).*

*Primary Examiner* — Ryan Rink
(74) *Attorney, Agent, or Firm* — Lorenz & Kopf LLP (57) ABSTRACT

The present application generally relates to a method and apparatus for controlling an autonomous vehicle. In particular, the method and apparatus are operative for detecting, by a sensor, an object within a first vehicle path, generating, by a processor, a second vehicle path in response to either the detection of the object such that the second vehicle path avoids the object, or a user initiated trajectory shift, generating, by the processor, an initial steering torque in response to the second vehicle path, performing, by the processor, an adaptation on the initial steering torque to generate an adapted steering torque in response to the initial steering torque exceeding a torque rate limit, and controlling, by a vehicle controller a host vehicle steering system to follow the second vehicle signal path in response to the adapted steering torque.

20 Claims, 5 Drawing Sheets

(56) References Cited

U.S. PATENT DOCUMENTS

| | | | | |
|---|---|---|---|---|
| 2017/0166254 | A1* | 6/2017 | Katoh | B62D 15/0265 |
| 2018/0190123 | A1* | 7/2018 | Oka | G08G 1/167 |
| 2019/0009779 | A1* | 1/2019 | Kim | B62D 6/10 |
| 2019/0283748 | A1* | 9/2019 | Hajika | G06V 20/588 |
| 2020/0023900 | A1* | 1/2020 | Jonasson | B62D 15/0265 |
| 2020/0180687 | A1* | 6/2020 | Ye | B62D 6/003 |
| 2020/0189573 | A1* | 6/2020 | King | B60W 30/0956 |
| 2021/0016769 | A1* | 1/2021 | Mitsumoto | B62D 6/04 |
| 2021/0097858 | A1* | 4/2021 | Moretti | G01C 21/3647 |
| 2021/0276612 | A1* | 9/2021 | Endo | B62D 5/0481 |
| 2021/0291811 | A1* | 9/2021 | Otake | B60W 10/04 |
| 2022/0001860 | A1* | 1/2022 | Do | B60W 30/09 |
| 2022/0144334 | A1* | 5/2022 | Kakas | B62D 6/002 |

* cited by examiner

METHOD AND APPARATUS FOR AUTOMATED LATERAL CONTROLS ADAPTATION IN RESPONSE TO RAPID TRAJECTORY CHANGES

BACKGROUND

The present disclosure relates generally to programming autonomous motor vehicle control systems. More specifically, aspects of this disclosure relate to systems, methods and devices of path shaping for an automated driver assist system equipped vehicle by reducing lateral acceleration and steering oscillation in response to rapid trajectory changes.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various automated driver-assistance systems, such as cruise control, adaptive cruise control, and parking assistance systems correspond to lower automation levels, while true "driverless" vehicles correspond to higher automation levels.

Automated driver assist system (ADAS) algorithms, such as a lane change on demand (LCoD) and collision avoidance steering, typically determine a vehicle path in response to detection of obstacles, lane markers, roadway path and other external factors. Often these feature behaviors may introduce sudden trajectory changes do not match a vehicle occupant's expectation and may cause alarm and/or discomfort to vehicle occupants. In some instances, there may be a perception of unstable controls performance during ADAS operation and a reduction in feature availability due to disengagements caused by sudden path changes. It would be desirable to address these problems and provide a methodology for vehicle path shaping with automated lateral controls adaptation in response to rapid trajectory changes during automated driver assistance operations.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems to perform an automated lateral controls adaptation in response to rapid trajectory changes for an ADAS equipped vehicle.

In accordance with an aspect of the present disclosure, an adaptive driving assistance apparatus including a sensor configured for detecting an object within a first vehicle path, a processor configured to generate a second vehicle path in response to either the detection of the object such that the second vehicle path avoids the object, or a user initiated trajectory shift, the processor further configured for generating an initial steering torque in response to the second vehicle path, for performing an adaptation on the initial steering torque to generate an adapted steering torque in response to the initial steering torque exceeding a torque rate limit, and a vehicle controller for controlling a host vehicle steering system to follow the second vehicle signal path in response to the adapted steering torque.

In accordance with another aspect of the present disclosure wherein the initial steering torque is generated by a lateral controller in response to a lateral vehicle position and a vehicle heading error.

In accordance with another aspect of the present disclosure wherein the adaptation is a first order adaptation in response to a frequency at a maximum phase lead and a maximum phase lag of the initial steering torque.

In accordance with another aspect of the present disclosure wherein the adaptation is a second order adaptation in response to a damping ratio, a frequency at a maximum phase lead and a maximum phase lag of the initial steering torque.

In accordance with another aspect of the present disclosure wherein the sensor is a camera and wherein the object is detected using image processing techniques.

In accordance with another aspect of the present disclosure wherein the sensor is a lidar and wherein the object is detected in response to a depth map generated by the lidar.

In accordance with another aspect of the present disclosure wherein the adapted steering torque is an optimized torque command for a rapid trajectory change.

In accordance with another aspect of the present disclosure wherein the adaptation compensates for a phase lag introduced by a rapid trajectory path change.

In accordance with another aspect of the present disclosure wherein the adapted steering torque is coupled to an electronic power steering system for controlling a rate of change of a steering angle.

In accordance with another aspect of the present disclosure, a method including detecting, by a sensor, an object within a first vehicle path, generating, by a processor, a second vehicle path in response to either the detection of the object such that the second vehicle path avoids the object, or a user initiated trajectory shift, generating, by the processor, an initial steering torque in response to the second vehicle path, performing, by the processor, an adaptation on the initial steering torque to generate an adapted steering torque in response to the initial steering torque exceeding a torque rate limit, and controlling, by a vehicle controller a host vehicle steering system to follow the second vehicle signal path in response to the adapted steering torque.

In accordance with another aspect of the present disclosure wherein the initial steering torque is generated by a lateral controller in response to a lateral vehicle position and a vehicle heading error.

In accordance with another aspect of the present disclosure wherein the adaptation is a first order adaptation in response to a frequency at a maximum phase lead and a maximum phase lag of the initial steering torque.

In accordance with another aspect of the present disclosure wherein the adaptation is a second order adaptation in response to a damping ratio, a frequency at a maximum phase lead and a maximum phase lag of the initial steering torque.

In accordance with another aspect of the present disclosure wherein the sensor is a camera and wherein the object is detected using image processing techniques.

In accordance with another aspect of the present disclosure wherein the sensor is a lidar and wherein the object is detected in response to a depth map generated by the lidar.

In accordance with another aspect of the present disclosure wherein the adapted steering torque is an optimized torque command for a rapid trajectory change.

In accordance with another aspect of the present disclosure wherein the adaptation compensates for a phase lag introduced by a rapid trajectory path change.

In accordance with another aspect of the present disclosure wherein the adapted steering torque is coupled to an electronic power steering system for controlling a rate of change of a steering angle.

In accordance with another aspect of the present disclosure, an adaptive driving assistance system for performing an adaptive driving assistance algorithm in a host vehicle including a first sensor configured for generating a depth map of a field of view, second vehicle sensor configured to determine a vehicle velocity, a processor for detecting an object within the field of view in response to the depth map, the processor being further configured to generate a vehicle path such that the host vehicle avoids the object or follows a new requested trajectory by the user, a vehicle controller configured to generate an initial steering torque in response to the vehicle path, to compare the initial steering torque to a torque rate limit, and to generate an adapted steering torque in response to the vehicle velocity and the initial steering torque exceeding the torque rate limit, and a steering controller for adjusting a host vehicle steering angle in response to the initial steering torque and the adjusted steering torque.

In accordance with another aspect of the present disclosure wherein the steering controller is an electronic power steering system.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
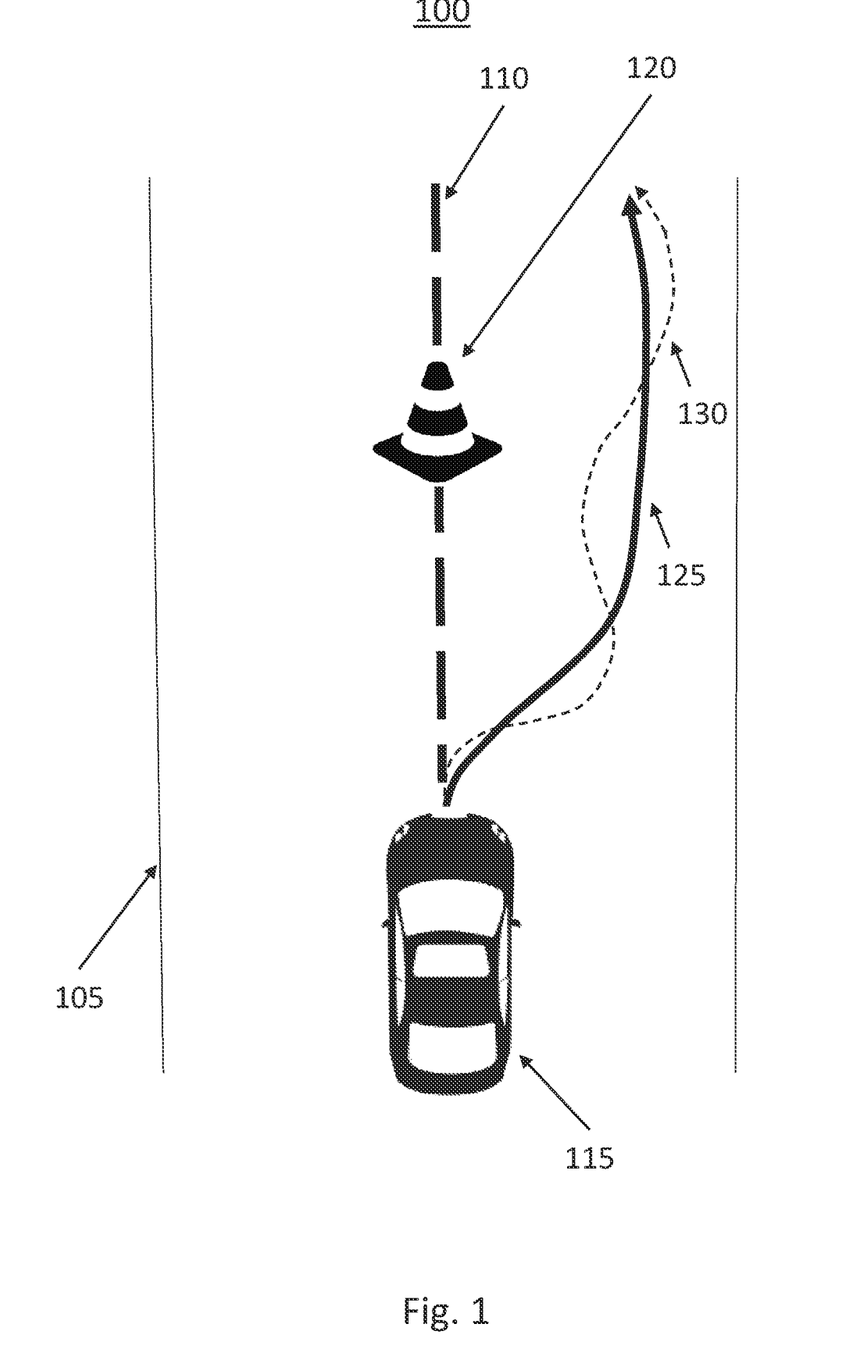
FIG. 1 shows an operating environment for automated lateral controls adaptation in response to rapid trajectory changes for an ADAS equipped vehicle according to an exemplary embodiment.

FIG. 1 schematically illustrates an operating environment 100 for use of an automated lateral controls adaptation in response to rapid trajectory changes for an ADAS equipped vehicle according to an exemplary embodiment. The exemplary operating environment 100 includes a two-lane roadway 105 with a lane center 110, a host vehicle 115, an obstacle 120, an automated adaption vehicle path 125 and a control vehicle path 130.

Occasionally when maneuvers are initiated by an ADAS within a host vehicle, sudden trajectory changes may result in step inputs into the control system which can introduce instability and performance issues. Prior systems were subject to rapid trajectory path changes as the vehicle path may only be calculated every ten milliseconds. When a sudden trajectory change is detected, this may cause sudden step inputs in the controls. These sudden step inputs may result in unstable control performance during ADAS operations such as LCoD, LCoD abort and Collision Imminent Steering. Unstable control performance may result in ADAS disengagement and/or an unconformable or unexpected experience for vehicle occupants.

The currently disclosed system and method are configured for adapting the control signal in these scenarios to provide a desired system response. In response to sudden and rapid trajectory changes that commonly occur in maneuvers such as LCoD and Collision Imminent Steering, the exemplary automated controls adaptation is configured to adjust the control vehicle path 130 to generate the automated adaption vehicle path 125. Advantageously, the automated adaption vehicle path 125 improves vehicle stability by reducing steering overshoot and undershoot caused by rapid trajectory changes when controlling the vehicle steering. The automated adaption vehicle path 125 improves stability of the controls, increase stability margins, improves feature availability of lateral controls features by adapting the control signal to improve performance, driving feel for lateral controls features and to increase stability margins and reduce calibration complexity when calibrating for these maneuvers.

In the exemplary environment 100, the host vehicle 115 may be traveling along a vehicle path collocated with the lane center 110. Upon detection of the obstacle 120 by vehicle sensors systems, the ADAS system within the host vehicle is configured to calculate a new vehicle path such that the host vehicle 115 safely avoids the obstacle 120. A control signal is then generated by the ADAS system of control vehicle systems to follow the new vehicle path. Without adaptation of the control signal, the vehicle may end up following the control vehicle path 130 due to the rapid trajectory changes resulting from the step inputs to the vehicle control systems. The exemplary method is operative to perform an adaption to alter the vehicle control signal such that the host vehicle follows the more desirable automated adaption vehicle path 125.

The exemplary method and system are configured for adaptation of the control signal in the presence of rapid trajectory changes in order to increase lateral controls feature availability, increase stability margins for the vehicle control systems, add system capability to handle large and rapid changes to the path thereby optimize driver comfort, feature consistency and occupant safety. Adaptation of the control signal improves vehicle stability by reducing steering overshoot and undershoot caused by rapid trajectory changes when controlling the vehicle steering. This adaptation of the control signal results in reduced lateral jerk and lateral acceleration during times of rapid path changes such as at the start of LCoD/LCoD abort maneuvers, reduction of control oscillations in the controls due to sudden and rapid path changes, increase stability margins, reduction of system instability through calibration and reduction of the calibration complexity for maneuvers with rapid trajectory changes. The adaptation of the control signal to may further compensate for phase lag introduced by rapid trajectory path changes.

In an alternate embodiment, the exemplary automated lateral controls adaptation in response to rapid trajectory changes initiated by a vehicle operation, such as LCoD operations and/or LCoD abort operations. For example, the ADAS system may initiate a lane change in response to an LCoD algorithm. A vehicle operator my abruptly abort the lane change by requesting a lane change back towards an original travel lane, during the lane change maneuver. Alternatively, a vehicle operator may initiate an unsafe lane change and the ADAS controller may abruptly direct the vehicle back to the original travel lane in response to an unsafe condition detected in response to the lane change operation. These abrupt change in direction of the vehicle may cause the undesirable vehicle path. In response, to this undesirable vehicle path, the ADAS controller may perform an automated adaption of the vehicle path, steering torque or the like, such that the vehicle follows a desired vehicle path.

Figure 2:
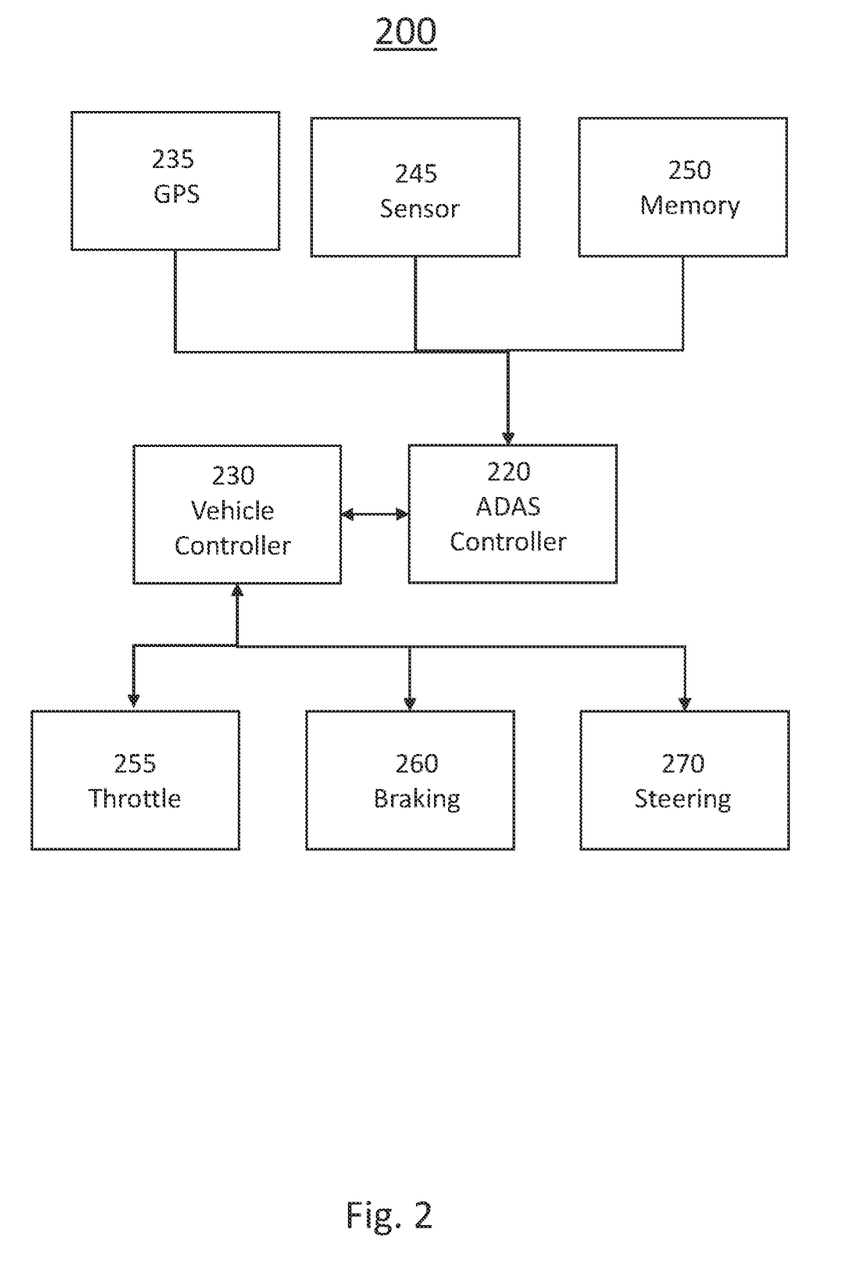
FIG. 2 shows a block diagram illustrating a system for automated lateral controls adaptation in response to rapid trajectory changes for an ADAS equipped vehicle according to an exemplary embodiment.

Turning now to FIG. 2, a block diagram illustrating an exemplary implementation of a system 200 for automated lateral controls adaptation in response to rapid trajectory changes for an ADAS equipped vehicle is shown. The exemplary system 200 is operative to generate control data to perform and adaptive lane keep operation for an ADAS equipped motor vehicle. The exemplary system 200 may include a camera 245, a memory 250 for storing map data, global positioning system (GPS) 235, an ADAS controller 220, a driver monitoring system (DMS) 240, a vehicle controller 230, a throttle controller 255, a braking controller 260 and a steering controller 270.

The exemplary system 200 may employ one or more sensors 245, such as cameras, Lidar, or radar, to detect the environment around the host vehicle. For example, the 245 may be mounted to the front of a vehicle and have a field of view covering a upcoming roadway surface during ADAS operation. Using image processing techniques, such as edge detection or the like, the ADAS controller 220 or a sensor fusion controller, may determine a distance from the host vehicle to an upcoming obstacle in the host vehicle path. The exemplary system may further include a memory 250 for storing map data including high resolution map data, and a GPS 235 to detecting a vehicle location. The exemplary system 200 may be configured to combine the information received from the GPS 235, the camera 245 and the memory 250 to estimate a location of the vehicle.

The ADAS controller 220 is first operative to receive data from one or more sensors 245 as well as data from the GPS 235 and the vehicle controller 230 to perform an ADAS operation, such as LCoD or adaptive cruise control. The ADAS controller 220 first generates an initial vehicle path in response to the sensor data, host vehicle location, map data and user input. The ADAS controller 220 then generates one or more control signals to couple to the vehicle controller 230 such that the host vehicle is controlled along the initial vehicle path.

In this exemplary embodiment, the ADAS controller 220 is further operative to detect an object, such as an obstruction, other vehicle, or static obstacle within the initial vehicle path. In response to the detection and to avoid a contact event with the object, the ADAS controller 220 generates an alternative vehicle path in order to control the host vehicle such that the host vehicle avoids the detected object. In response to the alternative vehicle path, the ADAS controller may generate a steering torque signal to couple to the vehicle controller 230 or a steering controller 270 to guide the host vehicle along the alternate vehicle path. The system then compares the steering torque signal to a torque limit and/or torque rate limit. If the steering torque signal exceeds the torque limit and/or torque rate limit, the system performs a controls adaptation to reduce sudden path changes. The controls adaptation may be a first order adaptation or a second order adaptation to compensate for phase lag introduced by rapid trajectory path changes and to reduce likelihood of introducing instability through calibrations. The adapted steering torque signal is then coupled to the vehicle controller 230 or a steering controller 270, such as an electronic power steering (EPS) system.

The vehicle controller 230 is configured to receive control data from the ADAS controller 220 and to control movement of the host vehicle in response to the control data. The vehicle controller 230 may generate throttle control signals to couple to the throttle controller 255 in order to control the speed of the host vehicle. The vehicle controller 230 may generate braking control signals to couple to the braking controller 260 in order to control the brake application pressure and brake application timing of the host vehicle. Likewise, the vehicle controller 230 may generate steering control signals to couple to the steering controller 270 in order to control the steering direction, and path, of the host vehicle.

Figure 3:
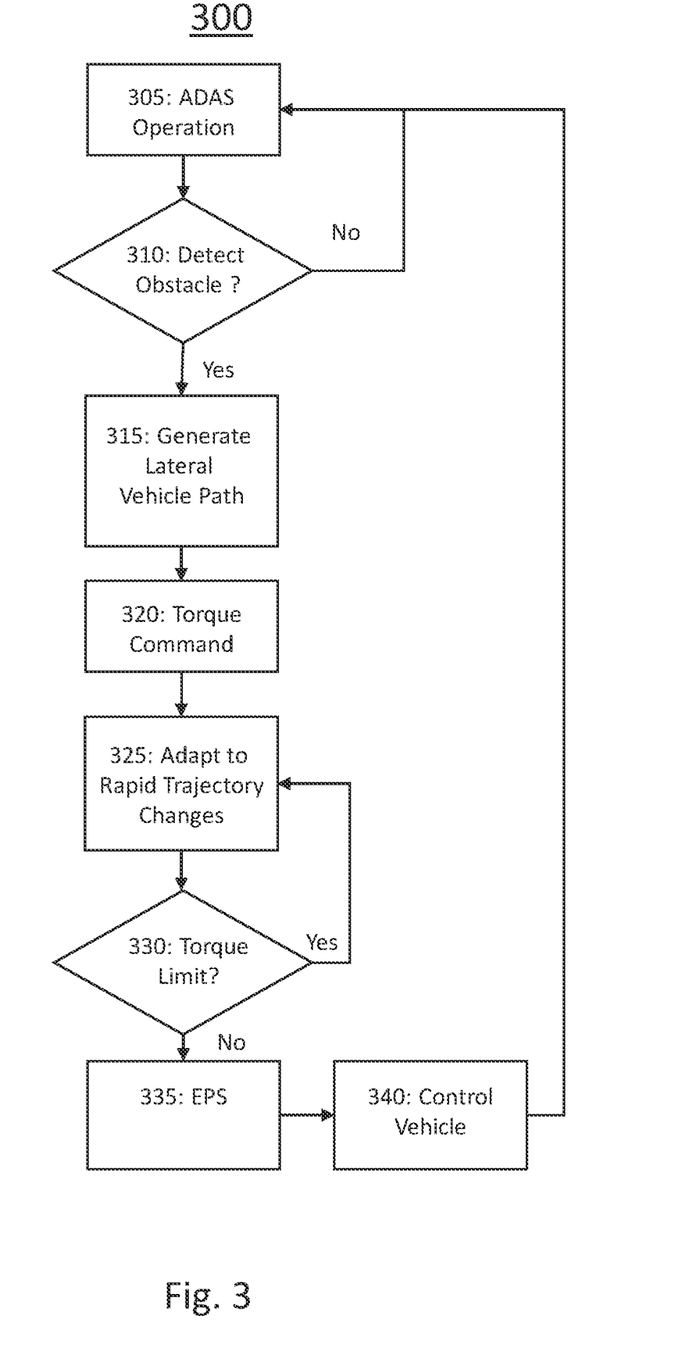
FIG. 3 shows a flow chart illustrating a method for automated lateral controls adaptation in response to rapid trajectory changes for an ADAS equipped vehicle according to another exemplary embodiment.

Turning now to FIG. 3, a flow chart illustrating an exemplary implementation of a method 300 for automated lateral controls adaptation in response to rapid trajectory changes for an ADAS equipped vehicle is shown. The exemplary method may be first engaged during operation of an ADAS. During ADAS operation 305, the ADAS controller is operative to receive sensor data from vehicle sensors to detect moving and stationary objects proximate to the vehicle, as well as map data from a memory and hast vehicle position data from a GPS sensor or the like. The ADAS controller generates an initial vehicle path in response to the map, location and sensor data as well as user input indicative of a destination and/or other user preferences or selections.

During operation, the ADAS controller performing the ADAS operation is operative to detect 310 objects within the initial vehicle path. If an object is not detected within the initial vehicle path, the method returns to ADAS operation 305. If an object is detected within the initial vehicle path, the method then generates 315 an adjusted vehicle path including a lateral vehicle path. The lateral vehicle path is generated such that the host vehicle avoids the detected object within the initial vehicle path. The adjusted vehicle path may further include an adjusted to the vehicle speed including reduction of vehicle throttle and/or application of braking systems.

The ADAS controller is then configured to generate control signals to control the host vehicle along the generated lateral vehicle path in order to avoid the detected objection. To control the host vehicle along the generated lateral vehicle path, the method may generate 320 a torque signal to apply to a steering controller in order to adjusted the direction of the host vehicle. The torque signal may be proportional to the steering angle of the host vehicle steering controller.

The method is next operative to compare the generated lateral vehicle path to an actual lateral vehicle path. To compare the generated lateral vehicle path to the actual lateral vehicle path being followed by the host vehicle, the method may compare 330 a torque signal level to a torque limit and/or torque rate limit. If the torque signal level does not exceed the torque limit and/or torque rate limit, the method then applies 335 the torque signal to an electronic power steering system (EPS) to adjust the steering angle. The method is then configured to control 340 the host vehicle in response to the steering angle and other measured vehicle dynamics, such as lateral acceleration as determined by an inertial measurement unit (IMU).

If the torque signal level exceeds the torque limit and/or torque rate limit, indicating a possible rapid trajectory change, the method may then perform 325 an adaption of the torque value in response to the detected torque output. The adaptation of the control system may be a first order adaption or a second order adaptation. In one exemplary embodiment, the rapid trajectory change controls adaptation may receive a lateral position error and a heading angle error to generate an optimized Torque command for rapid trajectory changes.

The first order adaptation may be determined in response to:

$$G_p(s) = \frac{s+z}{s+p} \quad z = \omega_c \frac{1-\sin(\phi_c)}{\cos(\phi_c)}$$

$$z\colon \text{zero},\; p\colon \text{pole} \quad p = \omega_c \frac{1+\sin(\phi_c)}{\cos(\phi_c)}$$

Where $\omega_c$ is the frequency at maximum phase lead and $\phi_c$ is the maximum phase lag (compensation).

The second order adaptation may be determined in response to:
Second order Adaptation:

$$G(s) = \frac{(s+z_1)(s+z_2)}{(s+p_1)(s+p_2)} = \frac{s^2 + 2\zeta\omega_z s + \omega_z^2}{s^2 + 2\zeta\omega_p s + \omega_p^2}$$

$$\omega_z = \omega_c\left(-\zeta\tan(\phi_m) + \sqrt{\zeta^2\tan^2\phi_m + 1}\right)$$

$$\omega_p = \omega_c\left(\zeta\tan(\phi_m) + \sqrt{\zeta^2\tan^2\phi_m + 1}\right)$$

Where $\omega_c$ is the frequency at maximum phase lead and $\phi_c$ is the maximum phase lag (compensation) and $\zeta$ is the damping ratio.

After the adaptation, the adapted torque signal level is then compared 330 to the torque limit and/or torque rate limit. If the torque limit and/or torque rate limited is exceeded, the adapted torque signal level is further adapted 325. If the torque limit and/or torque rate limit is not exceeded, the adapted torque signal level is applied 335 to the EPS and the ADAS controller is further configured to control 340 the host vehicle and return to ADAS operation 305.

Figure 4:
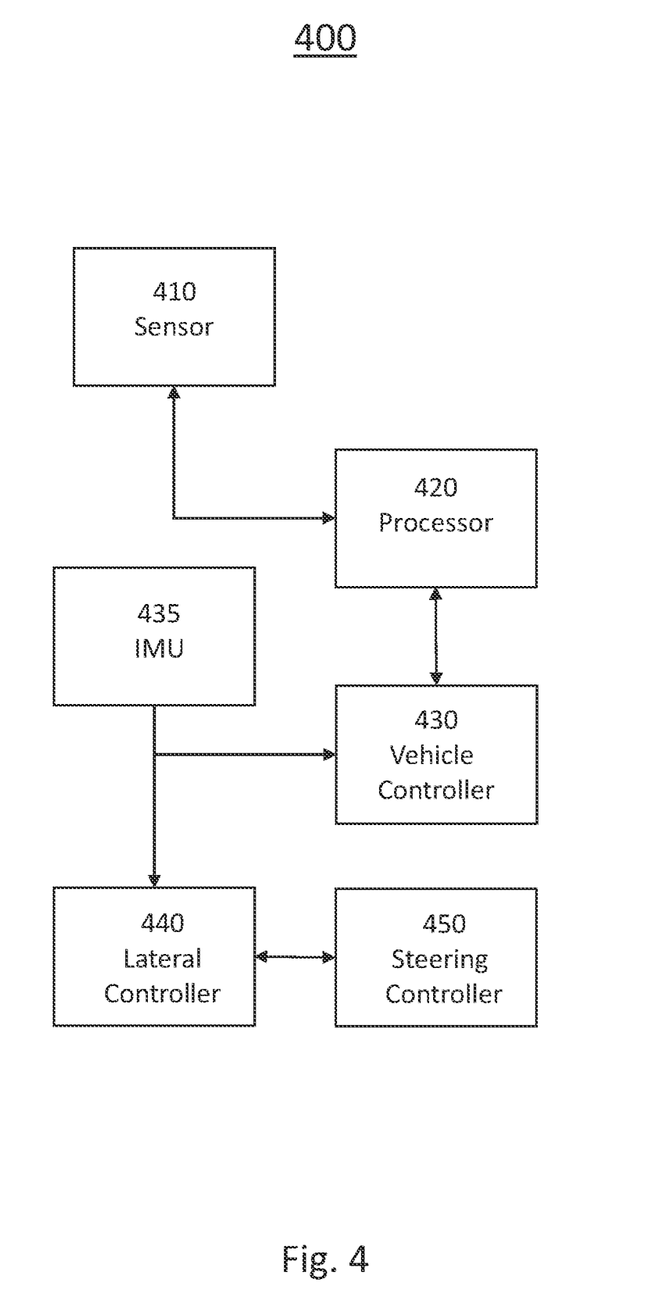
FIG. 4 shows a block diagram illustrating an exemplary implementation of a system for automated lateral controls adaptation in response to rapid trajectory changes for an ADAS equipped vehicle according to an exemplary embodiment.

Turning now to FIG. 4, a block diagram illustrating an exemplary implementation of a system 400 for automated lateral controls adaptation in response to rapid trajectory changes for an ADAS equipped vehicle is shown. The exemplary system 400 may include a sensor 410, a processor 420, a vehicle controller 430, a lateral controller 440 and a steering controller 450.

The sensor 410 is configured to detect objects within a field of view covering a vehicle path. The sensor 410 may be one or more forward facing cameras positioned at different locations on the host vehicle and each having a field of view covering an upcoming roadway. Image processing techniques may be used to generate a three dimensional depth map in response to one or more images captured from each camera. The depth map may then be coupled to the processor 420 for detection of an object within the vehicle path. Alternatively, the sensor may be a lidar, a radar, infrared depth sensor, or any appropriate distance measuring sensor.

The processor 420 is first configured to detect the object within the vehicle path. The object may be detected by comparing a depth map or other indicator of proximate objects map data stored in a memory or the like. The processor 420 then generates a second vehicle path in response to the detection of the object such that the second vehicle path avoids the object. The processor 420 may be further configured for generating an initial steering torque in response to the second vehicle path and for performing an adaptation on the initial steering torque to generate an adapted steering torque in response to the initial steering torque exceeding a torque limit and/or torque rate limit.

The vehicle controller 430 is configured for controlling a host vehicle steering system to follow the second vehicle signal path in response to initial steering torque and the adapted steering torque. In one exemplary embodiment, the initial steering torque may be generated by a lateral controller 440 in response to a lateral vehicle position and a vehicle heading error determined in response to additional vehicle sensors and vehicle control signals received from the vehicle controller. In this embodiment, the processor 420 is configured to generate the second vehicle path, couple this second vehicle path to the vehicle controller 430 and the vehicle controller 430 is operative to generated control signals to couple to a lateral controller 440 and a longitudinal controller. The lateral controller 440 couples lateral control signals to the steering controller 450 and monitors the performance of the host vehicle and performs the adaptation to generated an adapted lateral control, such as including an adapted steering torque, to control the steering torque such that the second vehicle path is accurately followed by the host vehicle. In one example, the adapted steering torque may be coupled to an electronic power steering system for controlling a rate of change of a steering angle.

Optionally for this exemplary embodiment, the adaptation may be a first order adaptation in response to a frequency at a maximum phase lead and a maximum phase lag of the initial steering torque. Alternatively, the adaptation may be a second order adaptation in response to a damping ratio, a frequency at a maximum phase lead and a maximum phase lag of the initial steering torque. The adapted steering torque may be an optimized torque command for a rapid trajectory change wherein the adaptation compensates for a phase lag introduced by a rapid trajectory path change.

In one exemplary embodiment of an adaptive driving assistance system for performing an adaptive driving assistance algorithm in a host vehicle, the exemplary system includes a first sensor 410, a second sensor, an ADAS processor 420, a vehicle controller 430 and a steering controller 450. The first sensor is configured for generating a depth map of a field of view where the field of view covers a current vehicle path. A second sensor, such as an IMU 435, may be configured to determine a host vehicle velocity and/or host vehicle accelerations. The processor may be further configured for detecting an object within the field of view in response to the depth map. The processor may then generate a vehicle path such that the host vehicle avoids the object. The processor 420 may then couple this vehicle path to a vehicle controller 430.

The vehicle controller 430 may then be configured to generate an initial steering torque in response to the vehicle path, to couple the initial steering torque to the steering controller and to compare the initial steering torque to a torque limit and/or torque rate limit. The vehicle controller 430 may then generate an adapted steering torque in response to the vehicle velocity and the initial steering torque exceeding the torque limit and/or torque rate limit. The steering controller 450 is configured for adjusting a host vehicle steering angle in response to the initial steering torque and the adjusted steering torque. In one exemplary embodiment, the steering controller is part of an electronic power steering system.

Figure 5:
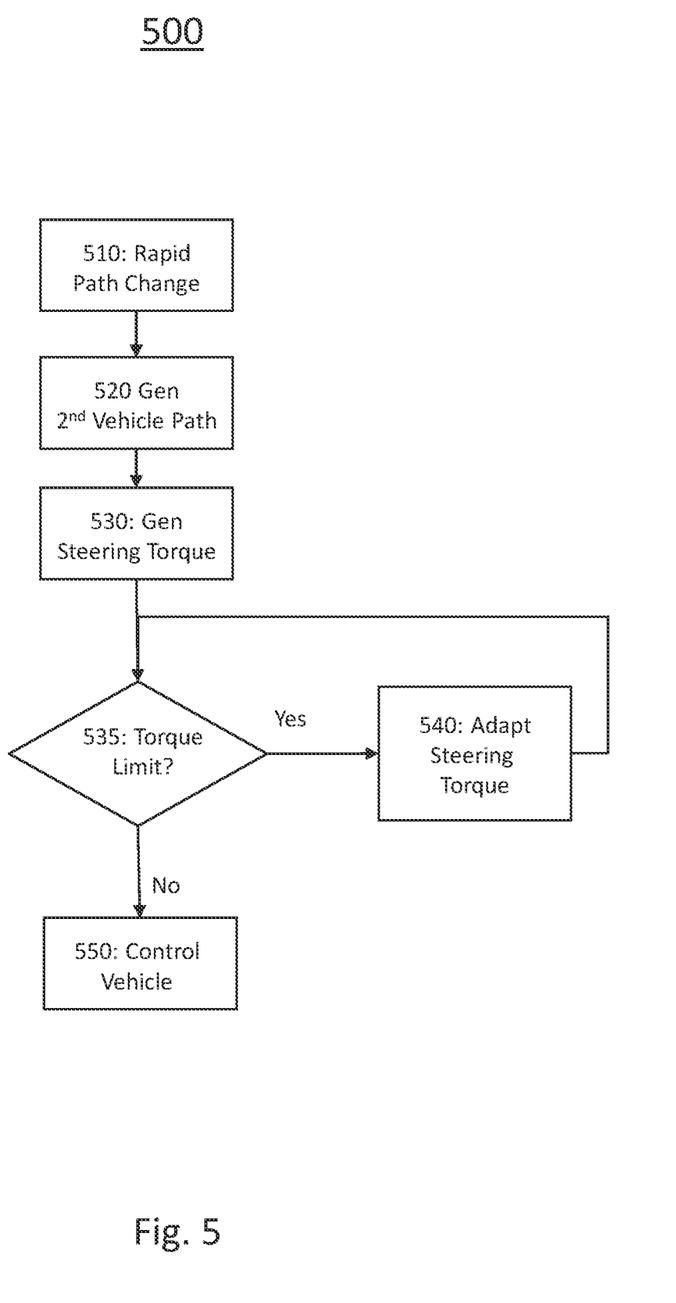
FIG. 5 shows a flow chart illustrating a method for automated lateral controls adaptation in response to rapid trajectory changes for an ADAS equipped vehicle according to another exemplary embodiment The exemplifications set out herein illustrate preferred embodiments of the invention, and such exemplifications are not to be construed as limiting the scope of the invention in any manner.

Turning now to FIG. 5, a flow chart illustrating an exemplary implementation of a method 500 for automated lateral controls adaptation in response to rapid trajectory changes for an ADAS equipped vehicle is shown. A method is first operative for detecting 510 a rapid trajectory change of the host vehicle or the host vehicle steering controls. In one example, the rapid trajectory change may be detected using an IMU. Alternatively, the rapid trajectory change may be detected in response to signals or depth maps generated by one or more vehicle sensors indicating the presence of an object within the first vehicle path. On one example, the sensor may be a camera and wherein the object is detected using image processing techniques. Alternatively, the sensor may be a lidar and wherein the object is detected in response to a depth map generated by the lidar. In one exemplary embodiment, the rapid trajectory change may be detected in response to signals generated by one or more sensors indicating a change in the desired vehicle trajectory. For example, the method may detect a rapid trajectory change in response to a measured jump in the error signals into the vehicle controls. These error signals may be calculated through the front camera, map and IMU combined, or may use GPS data, or data received via vehicle to vehicle (V2V), vehicle to infrastructure (V2I) or vehicle to everything (V2I) communications.

The method next generates 520 a second vehicle path in response to the rapid trajectory change. The processor may be an ADAS processor, digital signal processor, microcontroller or combination thereof. The method in next operative for generating 530 an initial steering torque in response to the second vehicle path; the initial steering torque is generated by a lateral controller in response to a lateral vehicle position and a vehicle heading error In this exemplary embodiment, the method is operative to compare 535 the initial steering torque to a torque limit and/or torque rate limit. The torque limit and/or torque rate limit may be indicative of a change of steering direction that may be uncomfortable to vehicle occupants or may cause unstable vehicle performance. The steering torque limit have a variable threshold dependent on other vehicle operating conditions such as vehicle speed, road conditions and the like. The method next performs an adaptation 540 on the initial steering torque is operative to generate an adapted steering torque in response to the initial steering torque exceeding a torque limit and/or torque rate limit. The adaptation may be a first order adaptation in response to a frequency at a maximum phase lead and a maximum phase lag of the initial steering torque. Alternatively, the adaptation may be a second order adaptation in response to a damping ratio, a frequency at a maximum phase lead and a maximum phase lag of the initial steering torque. The adapted steering torque may be an optimized torque command for a rapid trajectory change to compensate for a phase lag introduced by a rapid trajectory path change.

Finally, the method is configured for controlling 550, by a vehicle controller a host vehicle steering system to follow the second vehicle signal path in response to the adapted steering torque. In one example, the vehicle controller is a lateral controller configured for controlling a steering angle of the host vehicle. In one embodiment, the adapted steering torque may be coupled to an electronic power steering system for controlling a rate of change of a steering angle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An adaptive driving assistance apparatus comprising:
a sensor configured for detecting an object within a first vehicle path;
a processor configured to generate a second vehicle path in response to the detection of the object such that the second vehicle path avoids the object, the processor further configured for generating an initial steering torque in response to the second vehicle path, for performing an adaptation on the initial steering torque to generate an adapted steering torque in response to a torque signal level exceeding a torque limit, wherein the adapted steering torque is calculated using a lateral position error and a heading angle error; and
a vehicle controller for controlling a host vehicle steering system to follow the second vehicle path in response to the adapted steering torque.

2. The adaptive driving assistance apparatus of claim 1 wherein the initial steering torque is generated by a lateral controller in response to a lateral vehicle position and a vehicle heading error.

3. The adaptive driving assistance apparatus of claim 1 wherein the adaptation is a first order adaptation performed in response to a frequency at a maximum phase lead and a maximum phase lag of the initial steering torque.

4. The adaptive driving assistance apparatus of claim 1 wherein the adaptation is a second order adaptation in response to a damping ratio, a frequency at a maximum phase lead and a maximum phase lag of the initial steering torque.

5. The adaptive driving assistance apparatus of claim 1 wherein the torque limit is a torque rate limit.

6. The adaptive driving assistance apparatus of claim 1 wherein the sensor is a lidar and wherein the object is detected in response to a depth map generated by the lidar.

7. The adaptive driving assistance apparatus of claim 1 wherein the adapted steering torque is an optimized torque command for a trajectory change.

8. The adaptive driving assistance apparatus of claim 1 wherein the adaptation compensates for a phase lag introduced by a trajectory path change.

9. The adaptive driving assistance apparatus of claim 1 wherein the adapted steering torque is coupled to an electronic power steering system for controlling a rate of change of a steering angle.

10. A method comprising:
   detecting, by a sensor, a rapid trajectory shift from a first vehicle path;
   generating, by a processor, a second vehicle path in response to the detection of the rapid trajectory shift;
   generating, by the processor, an initial steering torque in response to the second vehicle path;
   performing, by the processor, an adaptation on the initial steering torque to generate an adapted steering torque in response to the a torque signal level exceeding a torque limit, wherein the adapted steering torque is calculated using a lateral position error and a heading angle error; and
   controlling, by a vehicle controller a host vehicle steering system to follow the second vehicle path in response to the initial steering torque and the adapted steering torque.

11. The method of claim 10 wherein the initial steering torque is generated by a lateral controller in response to a lateral vehicle position and a vehicle heading error.

12. The method of claim 10 wherein the adaptation is a first order adaptation in response to a frequency at a maximum phase lead and a maximum phase lag of the initial steering torque.

13. The method of claim 10 wherein the adaptation is a second order adaptation in response to a damping ratio, a frequency at a maximum phase lead and a maximum phase lag of the initial steering torque.

14. The method of claim 10 wherein the sensor is an inertial measurement unit.

15. The method of claim 10 wherein the torque limit is a torque rate limit.

16. The method of claim 10 wherein the adapted steering torque is an optimized torque command for a trajectory change.

17. The method of claim 10 wherein the adaptation compensates for a phase lag introduced by a trajectory path change.

18. The method of claim 10 wherein the adapted steering torque is coupled to an electronic power steering system for controlling a rate of change of a steering angle.

19. An adaptive driving assistance system for performing an adaptive driving assistance algorithm in a host vehicle comprising:
   a first sensor configured for generating a depth map of a field of view;
   second vehicle sensor configured to determine a vehicle velocity;
   a processor for detecting an object within the field of view in response to the depth map, the processor being further configured to generate a vehicle path such that the host vehicle avoids the object;
   a vehicle controller configured to generate an initial steering torque in response to the vehicle path, to compare the initial steering torque to a torque rate limit, and to generate an adapted steering torque in response a torque signal level exceeding the torque rate limit, wherein the adapted steering torque is calculated using a lateral position error, a heading angle error and the vehicle velocity; and
   a steering controller for adjusting a host vehicle steering angle in response to the initial steering torque and the adjusted steering torque.

20. The adaptive driving assistance system for performing the adaptive driving assistance algorithm in a host vehicle of claim 19 wherein the steering controller is an electronic power steering system.

* * * * *